(12) United States Patent
Ueda et al.

(10) Patent No.: US 8,436,935 B2
(45) Date of Patent: May 7, 2013

(54) IMAGE PICKING-UP DEVICE WITH A MOVING FOCUSING LENS

(75) Inventors: Hiroshi Ueda, Osaka (JP); Kouji Shibuno, Osaka (JP); Michihiko Ootsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 490 days.

(21) Appl. No.: 12/674,959

(22) PCT Filed: Aug. 7, 2008

(86) PCT No.: PCT/JP2008/002149
§ 371 (c)(1),
(2), (4) Date: Feb. 24, 2010

(87) PCT Pub. No.: WO2009/028139
PCT Pub. Date: Mar. 5, 2009

(65) Prior Publication Data
US 2011/0115966 A1  May 19, 2011

(30) Foreign Application Priority Data
Aug. 29, 2007  (JP) ................................ 2007-222939

(51) Int. Cl.
*H04N 5/232* (2006.01)
*G03B 13/36* (2006.01)

(52) U.S. Cl.
USPC ........................... 348/353; 348/364; 396/135

(58) Field of Classification Search .............. 348/345, 348/349, 351, 353, 354, 355, 356, 357, 363, 348/364; 396/135, 136
See application file for complete search history.

(56) References Cited

U.S. PATENT DOCUMENTS

| 5,666,562 | A  | * | 9/1997  | Kaneda et al. ............... 396/49 |
| 6,091,452 | A  | * | 7/2000  | Nishiyama ................ 348/349 |
| 6,151,072 | A  |   | 11/2000 | Tanaka |
| 6,882,369 | B1 |   | 4/2005  | Ito |
| 7,079,187 | B1 | * | 7/2006  | Yasuda ...................... 348/345 |
| 7,187,857 | B2 | * | 3/2007  | Okawara ................... 348/351 |
| 2002/0067421 | A1 | * | 6/2002 | Tanaka et al. ............. 348/345 |
| 2004/0057712 | A1 |   | 3/2004 | Sato et al. |

(Continued)

FOREIGN PATENT DOCUMENTS

| JP | 3-182711 A | 8/1991 |
| JP | 9-179014 A | 7/1997 |

(Continued)

*Primary Examiner* — Jason Whipkey
(74) *Attorney, Agent, or Firm* — Hamre, Schumann, Mueller & Larson, P.C.

(57) ABSTRACT

In an image pickup device of the present invention, in the case where a mode switch 116 selects a finder mode, a focusing lens is driven at a first speed when a focusing operation is performed in a focus control unit 203. In the case where the mode switch 116 selects a live view mode, the driving speed of the focusing lens is switched in a range lower than the first speed in accordance with brightness of an object detected by a photometric unit 114 when the focusing operation is performed in the focus control unit 203. With such a configuration, a lens driving control method is changed by AF control of a phase difference detection system and AF control of a hill climbing system, and a driving system suitable for each AF system is performed, whereby the focusing operation can be performed normally at a high speed.

6 Claims, 9 Drawing Sheets

U.S. PATENT DOCUMENTS

| | | | |
|---|---|---|---|
| 2004/0057714 A1* | 3/2004 | Kashiwaba et al. | 396/135 |
| 2004/0212722 A1* | 10/2004 | Yoshikawa et al. | 348/345 |
| 2006/0171699 A1* | 8/2006 | Nakai et al. | 396/125 |
| 2006/0232699 A1* | 10/2006 | Suto et al. | 348/345 |
| 2008/0025715 A1* | 1/2008 | Ishii | 348/349 |
| 2008/0025717 A1* | 1/2008 | Kawanishi | 348/345 |
| 2009/0002543 A1* | 1/2009 | Tomita et al. | 348/345 |
| 2009/0028539 A1* | 1/2009 | Nakahara | 396/104 |

FOREIGN PATENT DOCUMENTS

| | | |
|---|---|---|
| JP | 2000-111789 A | 4/2000 |
| JP | 2000-333064 A | 11/2000 |
| JP | 2002-258147 A | 9/2002 |
| JP | 2004-109690 A | 4/2004 |
| JP | 2005-311764 A | 11/2005 |

* cited by examiner

IMAGE PICKING-UP DEVICE WITH A MOVING FOCUSING LENS

TECHNICAL FIELD

The present invention relates to an image pickup device including an interchangeable lens having an autofocus function of performing a focusing operation by moving a focusing lens in an optical axis direction and a single-lens reflex camera body (hereinafter, referred to as a body).

BACKGROUND ART

Recently, an image pickup device such as a digital camera is provided with an autofocus (hereinafter, referred to as an AF) function capable of performing a focusing operation automatically on a device side.

A lens-interchangeable single-lens reflex camera generally is configured so that AF control can be performed with a phase difference detection system. Further, a digital camera of a compact type generally is configured so that AF control uses a contrast detection system (which is a so-called hill climbing system and may be referred to as a "hill climbing system" in the following description) of moving a focusing lens to a focused position based on the contrast of an image. On the other hand, some types of recent lens interchangeable single-lens reflex cameras have a finder mode capable of recognizing an optical image visually with an optical finder and a live view mode of displaying an image (through image) being captured by an image pickup element on a liquid crystal monitor in real time. In such a configuration, AF control of a phase difference detection system is suitable for the finder mode since a mirror is placed down, while AF control of a hill climbing system is suitable for the live view mode since a mirror is placed up. Patent Document 1 discloses a configuration in which the system of the AF control is switched automatically in accordance with the switching of the finder mode/live view mode.

Patent Document 1: JP 2000-333064 A

DISCLOSURE OF INVENTION

Problem to be Solved by the Invention

In the AF control of the phase difference detection system, an out-of-focus direction and an out-of-focus amount thereof can be detected with one AF detection. Therefore, a focusing lens of an interchangeable lens can be driven by full energizing (at a highest speed). If the AF control is switched from the phase difference detection system to the hill climbing system in this state, a peak (hill) of a contrast value may be skipped when a lens driving speed is highest because, according to the AF control of the hill climbing system, a contrast value (detected value) of an object is obtained in a time series to search for a peak thereof while a focusing lens is being driven. Thus, it takes a long period of time for the focusing lens to move to a focused position.

Further, according to the AF control of the phase difference detection system, a diaphragm in an interchangeable lens is left open during an AF operation (for the purpose of preventing a luminous flux used in an AF from being eclipsed). When the AF control is switched to the hill climbing system in this state, charge may overflow even if an electron shutter of an image pickup element is set at a highest speed in the case of a bright object. Consequently, an image obtained from the image pickup element becomes a halation image, and a contrast value is not obtained, which results in a state where the AF control of the hill climbing system cannot be performed normally.

An object of the present invention is to provide an image pickup device capable of changing a lens driving control method with AF control of a phase difference detection system and AF control of a hill climbing system and performing a driving system suitable for each AF system, thereby performing a normal and high-speed focusing operation.

Means for Solving Problem

A first configuration of an image pickup device of the present invention includes; an image pickup portion that converts an object image into an image signal and outputs the image signal; a focal point detecting portion that performs focal point detection of the object image formed on the image pickup portion by a first detection method or a second detection method; and a control portion that controls an operation of a focusing lens based on a detection result of the focal point detecting portion. In a case where the focal point detecting portion performs the focal point detection by the first detection method, the control portion controls the focusing lens so that the focusing lens is driven at a first speed, and in a case where the focal point detecting portion performs the focal point detection by the second detection method, the control portion controls the focusing lens so that the focusing lens is driven at a speed different from the first speed.

Further, a second configuration of an image pickup device of the present invention includes: an image pickup portion that converts an object image into an image signal and outputs the image signal; a focal point detecting portion that performs focal point detection of the object image formed on the image pickup portion by a first detection method or a second detection method; and a control portion that controls an operation of a diaphragm that regulates a light amount of the object image formed by the image pickup element. The control portion varies an f-number of the diaphragm between a case where the focal point detecting portion performs the focal point detection by the first detection method and a case where the focal point detecting portion performs the focal point detection by the second detection method.

Effects of the Invention

According to the present invention, a focusing operation can be performed normally at a high-speed.

DESCRIPTION OF THE INVENTION

Figure 1A:
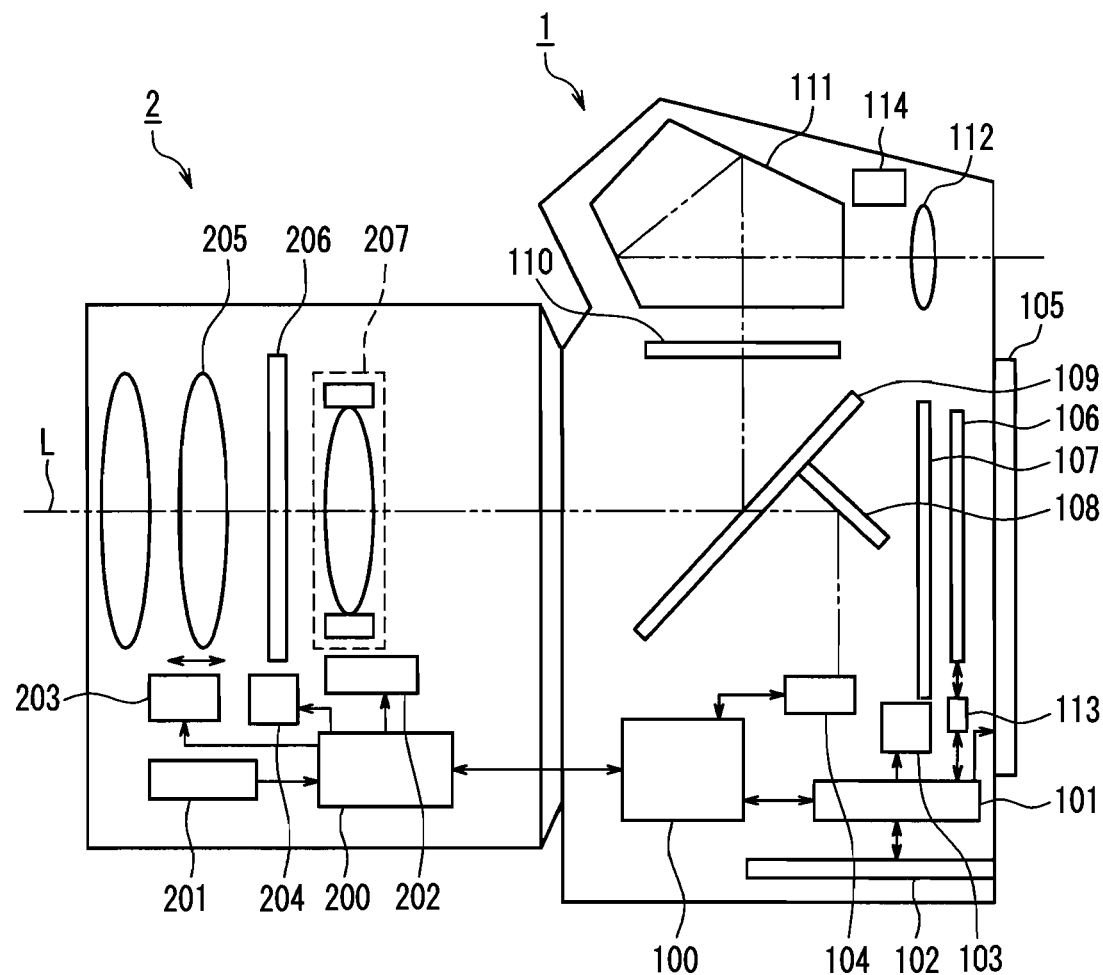
FIG. 1A is a schematic view showing a configuration of an image pickup device in an embodiment.

An image pickup device of the present invention can assume the following aspects based on the above configuration.

More specifically, in the first image pickup device of the present invention, the first detection method can be a phase difference detection system, and the second detection method can be a contrast detection system. With such a configuration, the focal point detection system in the focal point detecting portion can be switched automatically by switching an operation mode, which can enhance the ease of use.

Further, the first image pickup device of the present invention further includes an optical finder for visually recognizing the object image; a display portion that displays an image based on the image signal output from the image pickup portion; and a mode selecting portion capable of selectively switching a first operation mode in which the object image is capable of being recognized visually through the optical finder and a second operation mode in which the image based on the image signal output from the image pickup portion is displayed on the display portion. In a case where the mode selecting portion selects the first operation mode, the control portion controls the focal point detecting portion so that the focal point detecting portion performs the focal point detection by the first detection method, and in a case where the mode selecting portion selects the second operation mode, the control portion controls the focal point detecting portion so that the focal point detecting portion performs the focal point detection by the second detection method.

Further, the first image pickup device of the present invention further includes a brightness detecting portion that detects brightness of the object, wherein, in a case where the focal point detecting portion performs the focal point detection by the second detection method, the control portion switches a driving speed of the focusing lens in a range lower than the first speed in accordance with the brightness of the object detected by the brightness detecting portion.

Further, in the first image pickup device of the present invention, in a case where the focal point detecting portion performs the focal point detection by the second detection method, the control portion drives the focusing lens at a second speed lower than the first speed when the brightness of the object detected by the brightness detecting portion is a predetermined value or more, and the control portion drives the focusing lens at a third speed lower than the second speed when the brightness of the object detected by the brightness detecting portion is less than the predetermined value. With such a configuration, in the case where the object is bright, the focusing lens can be driven at a high speed and moved to a focused position quickly. In addition, in the case where the object is dark, the focusing lens is driven at a low speed, and hence, skipping of the focused position can be prevented. Thus, the focusing operation can be performed precisely at a high speed.

Further, the first image pickup device of the present invention further includes a diaphragm that regulates a light amount of the object image formed by the image pickup element, wherein the control portion varies an f-number of the diaphragm between a case where the focal point detecting portion performs the focal point detection by the first detection method and a case where the focal point detecting portion performs the focal point detection by the second detection method.

Further, the first image pickup device of the present invention further includes a brightness detecting portion that detects brightness of the object, wherein, in a case where the focal point detecting portion performs the focal point detection by the first detection method, the control portion places the diaphragm in a fully opened state, and in a case where the focal point detecting portion performs the focal point detection by the second detection method, the control portion switches the f-number of the diaphragm in accordance with the brightness of the object detected by the brightness detecting portion.

Further, in the first image pickup device of the present invention, in a case where the focal point detecting portion performs the focal point detection by the second detection method, the control portion decreases an opening amount of the diaphragm to be smaller than that in the fully opened state when the brightness of the object detected by the brightness detecting portion is equal to or more than a predetermined value, and the control portion places the diaphragm in the fully opened state when the brightness of the object detected by the brightness detecting portion is less than the predetermined value. With such a configuration, in the case where the object is bright, the halation of an image obtained from the image pickup element is prevented and in the case where the object is dark, the image obtained from the image pickup element is rendered bright, whereby the decrease in contrast of the image can be prevented, and the focusing operation by the contrast detection system can be performed precisely.

Further, in the second image pickup device of the present invention, the first detection method can be a phase difference detection system, and the second detection method can be a contrast detection system. With such a configuration, the focal point detection system in the focal point detecting portion can be switched automatically by switching an operation mode, which can enhance the ease of use.

Further, the second image pickup device of the present invention further includes: an optical finder for visually recognizing the object image; a display portion that displays an image based on the image signal output from the image pickup portion; and a mode selecting portion capable of selectively switching a first operation mode in which the object image is capable of being recognized visually through the optical finder and a second operation mode in which the image based on the image signal output from the image pickup portion is displayed on the display portion. In a case where the mode selecting portion selects the first operation mode, the control portion controls the focal point detecting portion so that the focal point detecting portion performs the focal detection by the first detection method, and in a case where the mode selecting portion selects the second operation mode, the control portion controls the focal point detecting portion so that the focal point detecting portion performs the focal point detection by the second detection method.

Further, the second image pickup device of the present invention further includes a brightness detecting portion that detects brightness of the object, wherein, in a case where the focal point detecting portion performs the focal point detection by the first detection method, the control portion places the diaphragm in a fully opened state, and in a case where the focal point detecting portion performs the focal point detection by the second detection method, the control portion switches an f-number of the diaphragm in accordance with the brightness of the object detected by the brightness detecting portion.

Further, in the second image pickup device of the present invention, in a case where the focal point detecting portion performs the focal point detection by the second detection method, the control portion decreases an opening amount of the diaphragm to be smaller than that in the fully opened state when the brightness of the object detected by the brightness detecting portion is equal to or higher than a predetermined value, and the control portion places the diaphragm in the fully opened state when the brightness of the object detected by the brightness detecting portion is less than the predetermined value. With such a configuration, in the case where the object is bright, the halation of an image obtained from the image pickup element is prevented and in the case where the object is dark, the image obtained from the image pickup element is rendered bright, whereby the decrease in contrast of the image can be prevented, and the focusing operation by the contrast detection system can be performed precisely.

(Embodiment)

[1. Configuration of an Image Pickup Device]

Figure 1B:
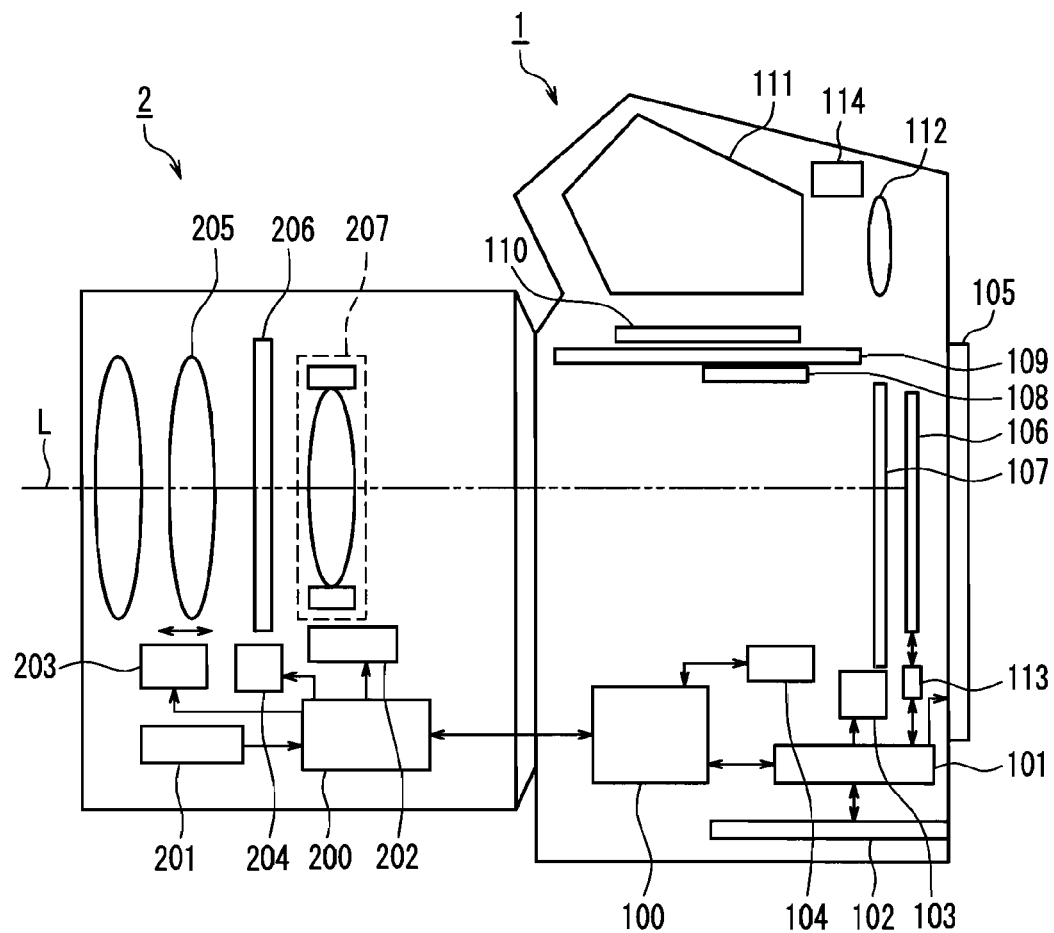
FIG. 1B is a schematic view showing a configuration of the image pickup device in the embodiment.
Figure 2:
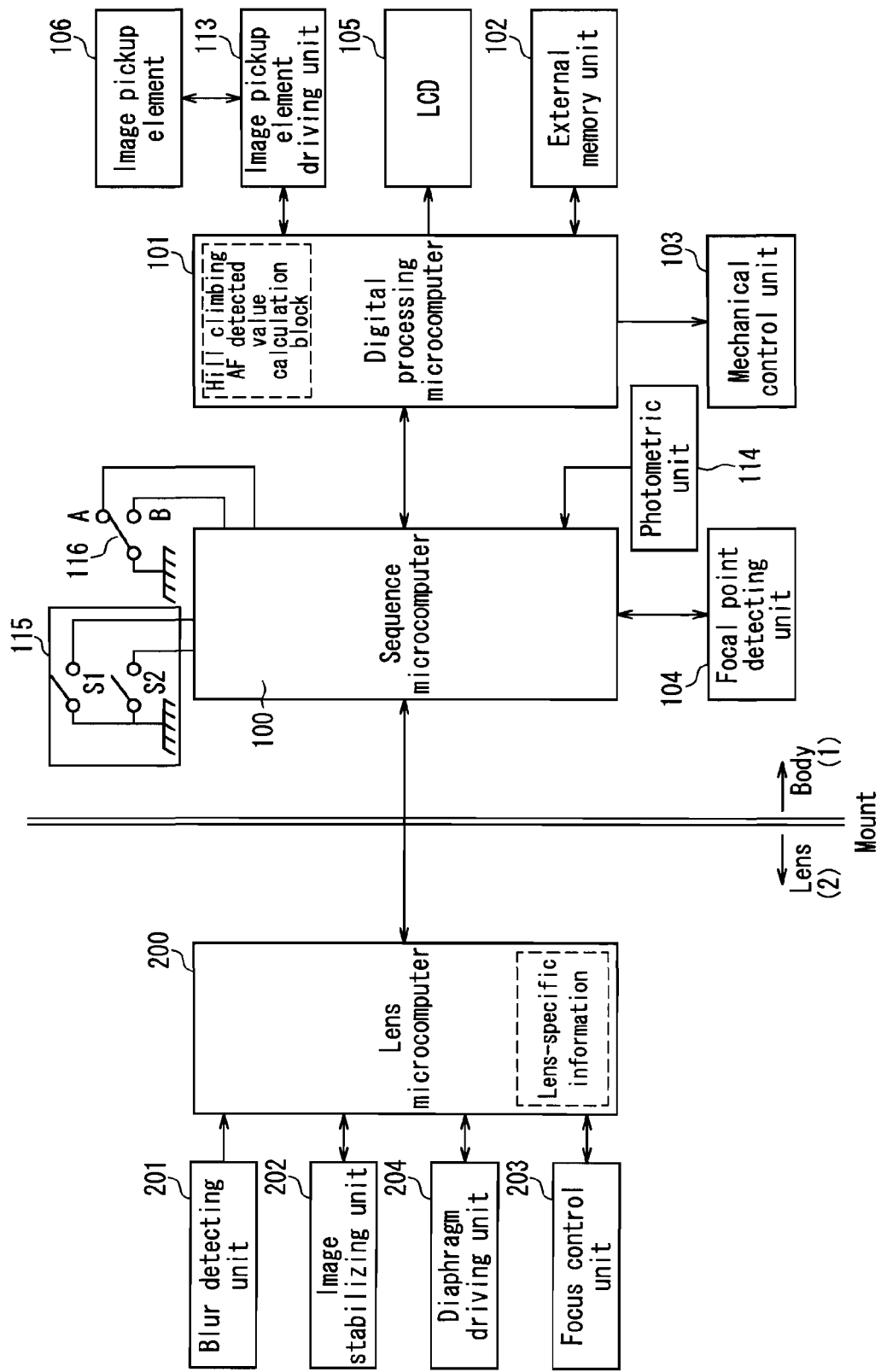
FIG. 2 is a schematic view showing a configuration of the image pickup device in the embodiment.

FIGS. 1A and 1B show a configuration of an image pickup device in an embodiment. FIG. 2 shows a control block in the image pickup device. The image pickup device basically is composed of a body 1 and an interchangeable lens 2, and the interchangeable lens 2 is attachable/detachable to a predetermined position of the body 1.

The body 1 includes a sequence microcomputer 100, a digital signal processing microcomputer 101, an external memory unit 102, a mechanical control unit 103, a focal point detecting unit 104, a liquid crystal unit for image display (hereinafter, referred to as an LCD) 105, an image pickup element 106, a shutter 107, a sub-mirror 108, a main mirror 109, a focusing glass 110, a pentaprism 111, an eyepiece 112, an image pickup element driving unit 113, a photometric unit 114, a release button 115, and a mode switch 116.

The sequence microcomputer 100 controls various sequences in the body 1. The sequence microcomputer 100 controls the operation of each part in the body 1 and outputs a control signal to a lens microcomputer 200, when a user operates the release button 115 or the mode switch 116.

The digital signal processing microcomputer 101 can convert an image signal output from the image pickup element 106 into image data that is a digital signal, and perform various kinds of signal processing such as white balance control. Further, the digital signal processing microcomputer 101 outputs the image data obtained by the signal processing to the external memory unit 102. Further, the digital signal processing microcomputer 101 can output the image data obtained by the signal processing to the LCD 105. Further, the digital signal processing microcomputer 101 can control the operation of the mechanical control unit 103.

The external memory unit 102 can record the image data output from the digital signal processing microcomputer 101 onto an information medium such as a memory card and read image data recorded on the information medium such as a memory card.

The mechanical control unit 103 can drive mechanisms such as the shutter 107, the sub-mirror 108, and the main mirror 109.

The focal point detecting unit 104 can capture an optical image reflected from the sub-mirror 108 and detect a focused state of the optical image. The focal point detecting unit 104 is composed of an image pickup element such as a CCD image sensor, and is composed of a line sensor in the present embodiment. The focal point detecting unit 104 is an example of a focal point detecting portion (in the case of the phase difference detection system).

The LCD 105 can display an image based on the image data for display generated by the digital signal processing microcomputer 101. In the present embodiment, although the LCD 105 is composed of a liquid crystal display, it may be composed of various display elements such as an organic EL display. Further, the LCD 105 is an example of a display portion.

The image pickup element 106 can convert an optical image incident via the interchangeable lens 2 into an image signal that is an electrical image and output the image signal. The image pickup element 106 can be composed of a CCD image sensor or a CMOS image sensor. Further, the image pickup element 106 is an example of an image pickup portion and a focal point detecting portion (in the case of the hill climbing system).

The shutter 107 is placed at a position opposed to an image pickup plane of the image pickup element 106, and can block the optical image or allow it to be incident upon the image pickup element 106 from the interchangeable lens 2 side.

The sub-mirror 108 reflects the optical image incident from the interchangeable lens 2 side to the focal point detecting unit 104 side. Further, the sub-mirror 108 can assume a state in which the sub-mirror 108 is positioned on an optical axis L as shown in FIG. 1A and a state in which the sub-mirror 108 is retracted from the optical axis L as shown in FIG. 1B.

The main mirror 109 is composed of a half mirror, and can reflect the optical image incident from the interchangeable lens 2 side to the focusing glass 110 side and transmit the optical image to the sub-mirror 108 side. Further, the main mirror 109 can assume a state in which the main mirror 109 is positioned on the optical axis L as shown in FIG. 1A and a state in which the main mirror 109 is retracted from the optical axis L as shown in FIG. 1B.

The focusing glass 110 forms the optical image reflected from the main mirror 109.

The pentaprism 111 reflects the optical image formed by the focusing glass 110 from inside and guides the optical image to the eyepiece 112 side. In the present embodiment, the optical finder is composed of the focusing glass 110, the pentaprism 111, and the eyepiece 112, and the user can recognize the optical image visually from outside of the eyepiece 112.

The image pickup element driving unit 113 can control the operation of the image pickup element 106 in accordance with an instruction from the digital signal processing microcomputer 101.

The photometric unit 114 can measure the light amount of an object. The photometric unit 114 is an example of a brightness detecting portion. In the present embodiment, although the light amount of an object is measured by the photometric unit 114, the light amount may be measured in accordance with the brightness of an image based on the image signal output from the image pickup element 106. Further, the photometric unit 114 may not be provided.

The release button 115 includes a switch S1 that is turned on when the release button 115 is pressed halfway and a switch S2 that is turned on when the release button 115 is pressed fully. Thus, when the release button 115 is pressed halfway by the user, the switch S1 is turned on, and when the release button 115 is pressed fully, the switches S1 and S2 are turned on.

The mode switch 116 is capable of switching between the finder view mode (first operation mode) and the live view mode (second operation mode). The live view mode refers to a mode in which an optical image incident upon the interchangeable lens 2 is converted into an electrical image in the body 1, and the electrical image can be displayed on the LCD 105. Further, the finder view mode refers to a mode in which the user visually can recognize an optical image incident upon the interchangeable lens 2 via the eyepiece 112. In the following description, the live view mode will be referred to as an "LV mode", and the finder view mode will be referred to as a "finder mode".

The interchangeable lens 2 includes the lens microcomputer 200, a blur detecting unit 201, an image stabilizing unit 202, a focus control unit 203, a diaphragm driving unit 204, a focusing lens 205, a diaphragm unit 206, and an image stabilizing lens unit 207.

The lens microcomputer 200 can control the blur correcting unit 202, the focus control unit 203, and the diaphragm driving unit 204 in accordance with an instruction from the sequence microcomputer 100. Further, the lens microcomputer 200 contains lens-specific information on the interchangeable lens 2 written in an internal memory, and can send the lens-specific information to the sequence microcomputer 100 in accordance with a request from the sequence microcomputer 100. The lens-specific information contains information on a focal length, information on a minimum f-number, and the like.

The blur detecting unit 201 can detect the blur and vibration of the image pickup device, and is composed of, for example, a gyrosensor.

The blur correcting unit 202 is controlled by the lens microcomputer 200 to move the image stabilizing lens unit 207 in a direction substantially perpendicular to the optical axis L, and corrects the blur of an optical image. The blur detecting unit 201 and the blur correcting unit 202 are not indispensable members, and the configurations corresponding to the blur detecting unit 201 and the blur correcting unit 202 may be provided on the body 1 side. In this case, for example, the configuration of shifting the image pickup element in a direction perpendicular to the optical axis to correct the blur of an image is conceivable. Further, means for performing blur detection and blur correction may not be provided.

The focus control unit 203 is controlled by the lens microcomputer 200 to move the focusing lens 205 in a direction of the optical axis L. Herein, the driving speed of the focusing lens 205 is varied between the case where an AF operation is performed using the phase difference detection system (finder mode) and the case where an AF operation is performed using AF control of a hill climbing system (LV mode). Specifically, as shown in Table 1, full energizing is performed in a focusing motor when the phase difference detection system is used, and the focusing lens 205 is driven at a highest speed. On the other hand, when the AF control of the hill climbing system is used, the driving speed is switched in two stages in accordance with the brightness of an object. In the case of a bright object (BV2 or more), the focusing lens 205 is driven at a driving speed that is ½ of the highest speed, and in the case of a dark object (less than BV2), the focusing lens 205 is driven at a driving speed that is ⅓ of the highest speed. The focus control unit 203 is an example of a focus control portion.

TABLE 1

Focusing lens driving table

|  | Phase difference detection system AF | Hill climbing system AF | |
|---|---|---|---|
|  |  | Bright (BV2 or more) | Dark (less than BV2) |
| Lens driving speed | Full energizing (highest speed) | Speed control (½ of highest speed) | Speed control (⅓ of highest speed) |

The diaphragm driving unit 204 is controlled by the lens microcomputer 200 to open/close the diaphragm unit 206. Herein, an f-number is varied between the case where an AF operation is performed using the phase difference detection system (finder mode) and the case where an AF operation is performed using the AF control of the hill climbing system (LV mode). Specifically, as shown in Table 2, a diaphragm is fully opened when the phase difference detection system is used. On the other hand, when the AF control of the hill climbing system is used, an f-number is switched in two stages in accordance with the brightness of an object. When an object is bright (BV10 or more), an f-number is set at F8, and when an object is dark (less than BV10), the diaphragm is fully opened. The diaphragm driving unit 204 is an example of a diaphragm control portion.

TABLE 2

Diaphragm table

|  | Phase difference detection system AF | Hill climbing system AF | |
|---|---|---|---|
|  |  | Bright (BV10 or more) | Dark (less than BV10) |
| F-number at a time of AF | Fully Opened | F8 | Fully Opened |

The focusing lens 205 is placed so as to be movable in a direction of the optical axis L by driving means such as a motor.

The diaphragm unit 206 has a plurality of vanes capable of moving in a direction substantially perpendicular to the optical axis L, and can control the amount of light passing from the focusing lens 205 side to the image stabilizing lens unit 207 side by moving the vanes from the central direction of the optical axis L to a direction leaving from the optical axis L.

The sequence microcomputer 100 and the lens microcomputer 200 are examples of a control portion.

[2. Operation of an Image Pickup Device]

Figure 3A:
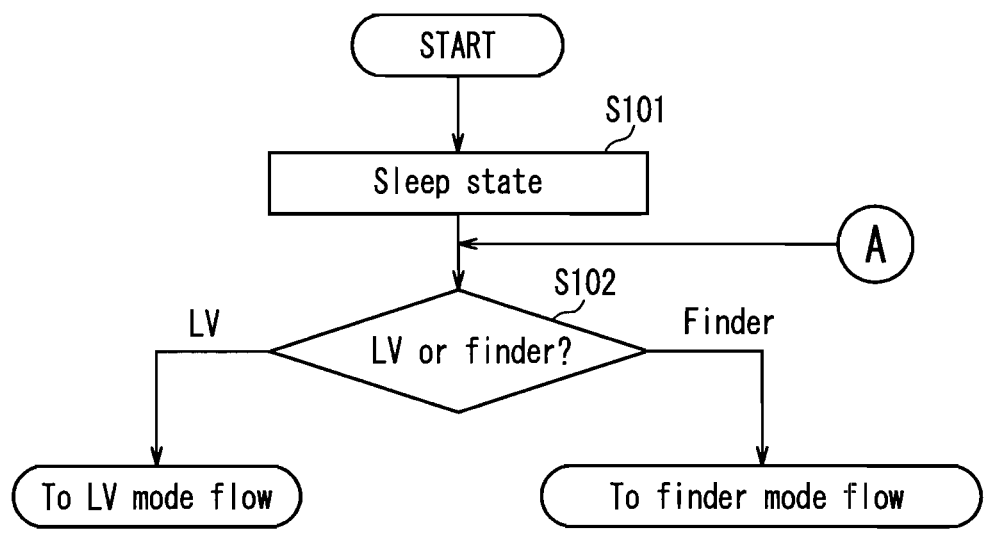
FIG. 3A is a flowchart illustrating an operation sequence of the image pickup device.
Figure 3B:
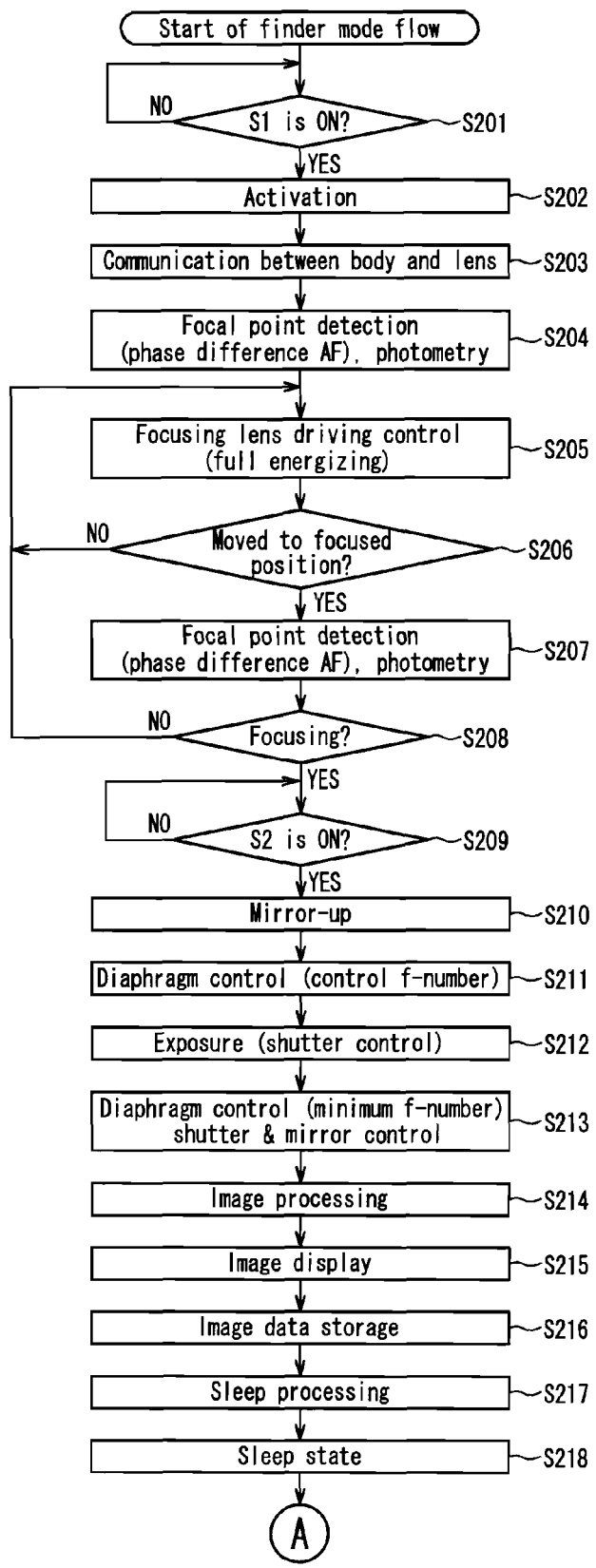
FIG. 3B is a flowchart illustrating an operation sequence of a finder mode.
Figure 3C:
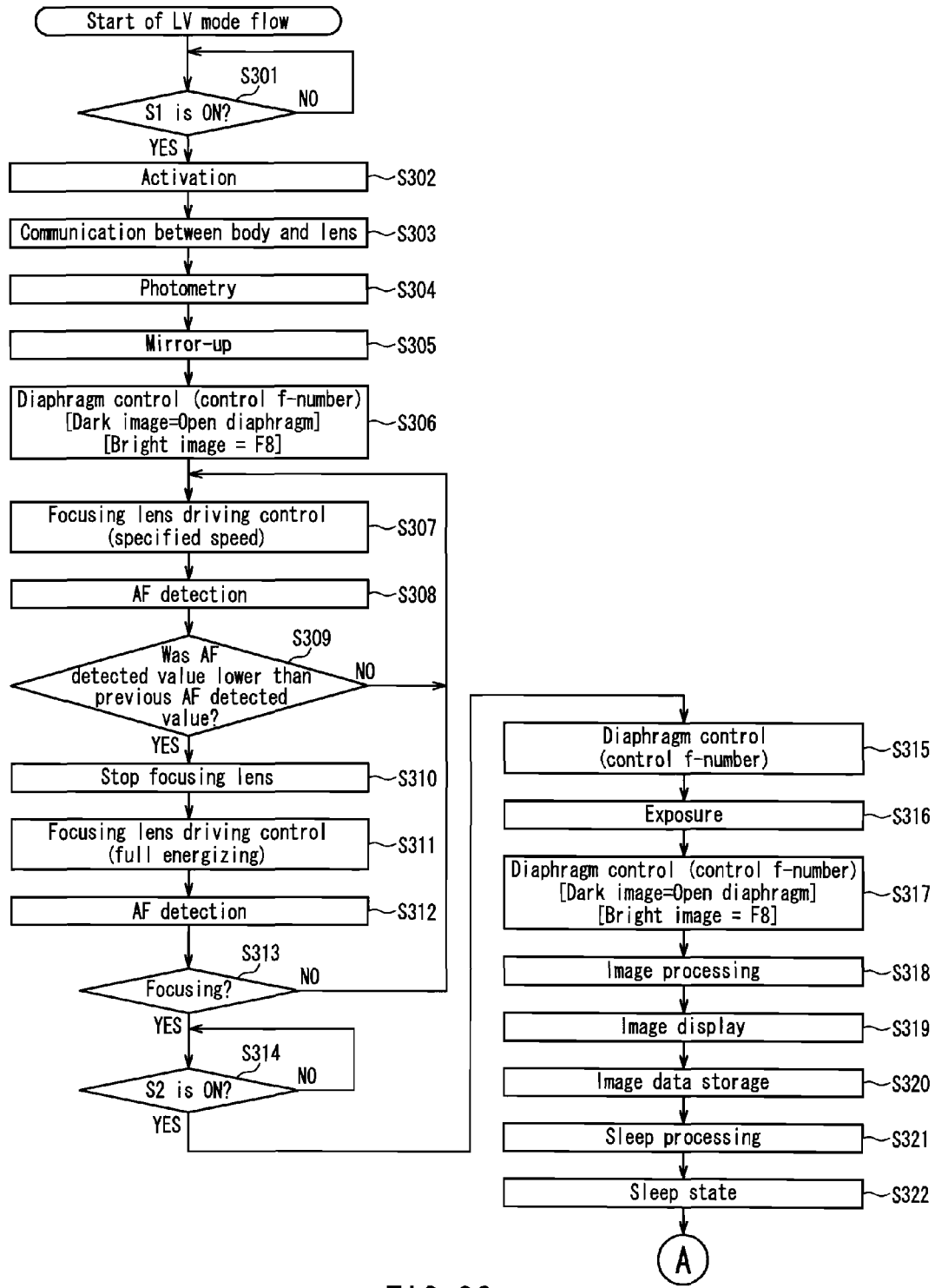
FIG. 3C is flowchart illustrating an operation sequence of an LV mode.
Figure 4:
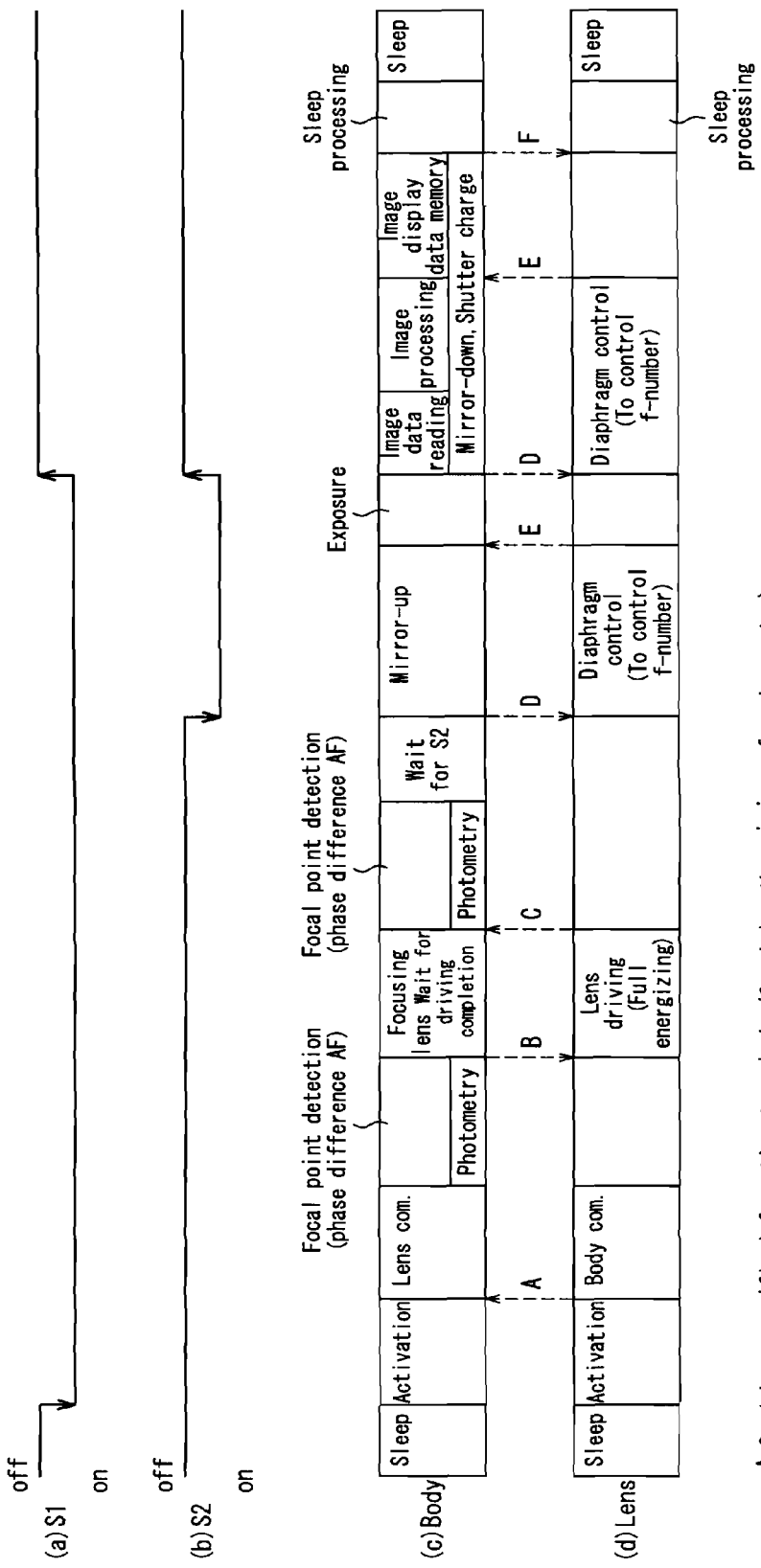
FIG. 4 is a timing chart showing an operation sequence of the finder mode.
Figure 5:
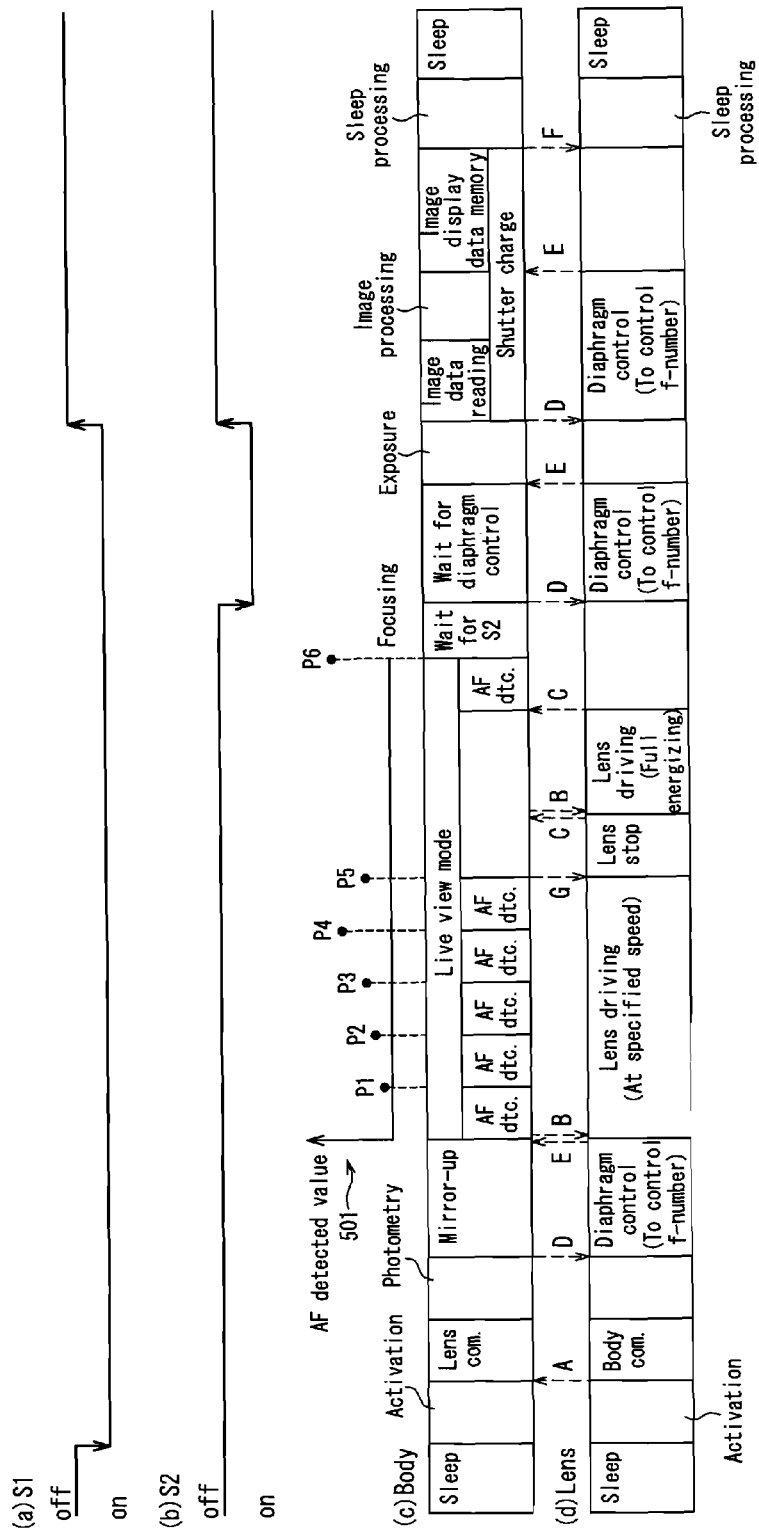
FIG. 5 is a timing chart showing an operation sequence of the LV mode.

FIG. 3A shows an operation flow at a time of starting the operation of the image pickup device. FIG. 3B shows an operation flow in a finder mode. FIG. 3C shows an operation flow in an LV mode. FIG. 4 is a timing diagram of the operation in the finder mode. FIG. 5 is a timing diagram of the operation in the LV mode. In FIGS. 4 and 5, (a) shows an ON/OFF state of a switch S1, (b) shows an ON/OFF state of a switch S2, (c) shows an operation on the body 1 side, and (d) shows an operation of the interchangeable lens 2 side. Further, FIGS. 3B and 4 will be referred to in the description of the operation in the finder mode, and FIGS. 3C and 5 will be referred to in the description of the operation in the LV mode.

In a sleep state (S101) in FIG. 3A, the image pickup device is in a state shown in FIG. 1A. More specifically, the main mirror 109 and the sub-mirror 108 are placed on the optical axis L, where the user can visually recognize an optical image through the optical finder via the eyepiece 112.

[2-1. Operation in a Finder Mode]

As shown in FIG. 3B, first, in the case where the release button 115 is pressed halfway to turn on the switch S1 (S201) when the mode switch 116 is connected to an A-side and the image pickup device is in the finder mode (S102 in FIG. 3A), the sequence microcomputer 100 controls each part in the image pickup device to activate the device (S202).

Next, the sequence microcomputer 100 communicates with the lens microcomputer 200 to request lens-specific information with respect to the lens microcomputer 200. The lens microcomputer 200 sends the lens-specific information written in an internal memory of the lens microcomputer 200 to the sequence microcomputer 100 based on the request from the sequence microcomputer 100 (arrow A in FIG. 4) (S203).

Next, the sequence microcomputer 100 instructs the focal point detecting unit 104 to detect a focal point. The focal point detecting unit 104 converts an optical image incident via the interchangeable lens 2, the main mirror 109, and the sub-mirror 108 into an electric signal, calculates an out-of-focus amount (hereinafter, referred to as a defocus amount), and outputs the calculated defocus amount to the sequence microcomputer 100. The focal point detecting unit 104 calculates a defocus amount using the phase difference detection system. The sequence microcomputer 100 instructs the lens microcomputer 200 to move the focusing lens 205 in the direction of the optical axis L by the defocus amount based on the defocus amount output from the focal point detecting unit 104 (arrow B in FIG. 4). Further, the focusing lens driving instruction from the sequence microcomputer 100 to the lens microcomputer 200 contains information such as a driving amount, a driving direction, and a driving speed of the focusing lens 205. Further, the sequence microcomputer 100 instructs the photometric unit 114 to perform a photometric operation. The photometric unit 114 measures the light amount of an object and sends the information on the light amount to the sequence microcomputer 100 (S204).

Next, the lens microcomputer 200 controls the focus control unit 203 in accordance with the instruction from the sequence microcomputer 100, and moves the focusing lens 205 in the direction of the optical axis L. At this time, the lens microcomputer 200 knows the driving amount of the focusing lens 205 from the current position of the focusing lens 205 to the focused position, and hence, instructs the focus control unit 203 to perform full energizing. The focus control unit 203 drives the focusing lens 205 at a highest speed (first speed) (S205).

Next, when the movement of the focusing lens 205 to the position based on the focusing lens driving instruction from the sequence microcomputer 100 has been completed, the lens microcomputer 200 sends a completion notification to the sequence microcomputer 100 (arrow C in FIG. 4) (S206).

Next, the sequence microcomputer 100 obtains the defocus amount from the focal point detecting unit 104 (S207), and checks whether or not the focusing lens 205 has arrived at the focused position based on the obtained defocus amount. That is, if the focusing lens 105 has arrived at the focused position, the defocus amount output from the focal point detecting unit 104 becomes zero. However, if the focusing lens 205 has not arrived at the focused position, the focal point detecting unit 104 outputs a value other than zero. If the focusing lens 205 has not arrived at the focused position, the sequence microcomputer 100 returns to S205 and controls the focusing lens 205 again so that the focusing lens 205 moves in the direction of the optical axis L. The focal point detecting unit 104 calculates a defocus amount using the phase difference detection system (S208).

Next, the sequence microcomputer 100 waits until the release button 115 is pressed fully, that is, the switch S2 is turned on. The release button 115 remains pressed halfway from S202 to S208, and hence, both the switches S1 and S2 are turned on when the release button 115 is pressed fully (S209).

Next, when the release button 115 is pressed fully by the user to turn on the switches S1 and S2, the sequence microcomputer 100 instructs the mechanical control unit 103 to perform a mirror-up operation. The mechanical control unit 103 moves the sub-mirror 108 and the main mirror 109 positioned on the optical axis L as shown in FIG. 1A to the position retracted from the optical axis L as shown in FIG. 1B (S210).

Next, the sequence microcomputer 100 instructs the lens microcomputer 200 to control a diaphragm based on the light amount information sent from the photometric unit 114 (arrow D in FIG. 4). The lens microcomputer 200 operates the diaphragm driving unit 204 so as to obtain a predetermined f-number (control f-number) based on the instruction from the sequence microcomputer 100. The lens microcomputer 200 sends a diaphragm control completion notification to the sequence microcomputer 100 if the f-number in the diaphragm driving unit 204 becomes a control f-number (arrow E in FIG. 4) (S211).

Next, the sequence microcomputer 100 instructs the mechanical control unit 103 to perform an exposure operation with respect to the shutter 107. The mechanical control unit 103 moves a front curtain in the shutter 107 so that the front curtain traverses the optical axis L at a predetermined timing and moves a rear curtain so that the rear curtain traverses the optical axis L at a predetermined timing. At this time, an optical image is incident upon the image pickup element 106 at a timing during which the front curtain retracts from the optical axis L and the rear curtain moves onto the optical axis L, and is subjected to photoelectric exchange in the image pickup element 106, whereby an electrical image can be obtained (S212).

Next, the sequence microcomputer 100 instructs the mechanical control unit 103 to move the main mirror 109 and the sub-mirror 108 and to charge the shutter 107. The mechanical control unit 103 moves the main mirror 109 and the sub-mirror 108 to the position shown in FIG. 1A and charges the shutter 107. Further, the sequence microcomputer 100 instructs the lens microcomputer 200 to perform diaphragm control based on the light amount information sent from the photometric unit 114 (arrow D in FIG. 4). The lens microcomputer 200 operates the diaphragm driving unit 204 based on the instruction from the sequence microcomputer 100 so as to obtain a predetermined f-number (control f-number). The lens microcomputer 200 sends a diaphragm control completion notification to the sequence microcomputer 100 if an f-number in the diaphragm driving unit 204 becomes a control f-number (arrow E in FIG. 4) (S213).

Further, the sequence microcomputer 100 instructs the digital signal processing microcomputer 101 to perform image processing of an electrical image output from the image pickup element 106. The digital signal processing microcomputer 101 subjects an analog image signal output from the image pickup element to digital conversion and performs various kinds of signal processing such as YC processing (S214).

Next, the sequence microcomputer 100 instructs the digital signal processing microcomputer 101 to save an image display instruction and image data. The digital signal processing microcomputer 101 controls so that the image data subjected to signal processing in S214 is displayed on the LCD 105 (S215). Along with this, the digital signal processing microcomputer 101 controls so that the image data is compressed and recorded on an information medium such as a memory card in the external memory unit 102 (S216).

Next, the sequence microcomputer 100 instructs each part in the body 1 and the lens microcomputer 200 to perform sleep processing (arrow F in FIG. 4) (S217). Thus, the body 1 and the interchangeable lens 2 are placed in a sleep state (S218).

[2-2. Operation in an LV Mode]

As shown in FIG. 3C, first, in the case where the release button 115 is pressed halfway to turn on the switch S1 (S301) when the mode switch 116 is connected to a B-side and the image pickup device is in the LV mode (S102 in FIG. 3A), the sequence microcomputer 100 controls each part in the image pickup device to activate the device (S302).

Next, the sequence microcomputer 100 communicates with the lens microcomputer 200 to request lens-specific information with respect to the lens microcomputer 200. The lens microcomputer 200 sends the lens-specific information written in an internal memory of the lens microcomputer 200 to the sequence microcomputer 100 based on the request from the sequence microcomputer 100 (arrow A in FIG. 5). The lens-specific information contains information on a focal length, information on an f-number, and the like (S303).

Next, the sequence microcomputer 100 controls the photometric unit 114 to perform a photometric operation. The photometric unit 114 measures the light amount of an object and sends the information on the light amount to the sequence microcomputer 100 (S304).

Next, the sequence microcomputer 100 controls the mechanical control unit 103 so that the mechanical control unit 103 performs a mirror-up operation. As shown in FIG. 1A, the mechanical control unit 103 moves the sub-mirror 108 and the main mirror 109 positioned on the optical axis L to the position retracted from the optical axis L as shown in FIG. 1B (S305).

Thus, an optical image incident from the interchangeable lens 2 side is incident upon the image pickup element 106. The image pickup element 106 converts the incident optical image into an electrical image and outputs it. The electrical image output from the image pickup element 106 is input to the digital signal processing microcomputer 101. The digital signal processing microcomputer 101 generates image data for display based on the electrical image and outputs the image data to the LCD 107. The LCD 107 displays an image (through image) based on the image data output from the digital signal processing microcomputer 101.

Next, the sequence microcomputer 100 outputs an instruction for controlling the diaphragm with respect to the lens microcomputer 200 based on the light amount information sent from the photometric unit 114 (arrow D in FIG. 5). The lens microcomputer 200 operates the diaphragm driving unit 204 so as to obtain a predetermined f-number (control f-number) based on the instruction from the sequence microcomputer 100. Specifically, when an object is bright (BV10 or more in the present embodiment), the lens microcomputer 200 instructs the diaphragm driving unit 204 to set an f-number at F8. Further, when an object is dark (less than BV10 in the present embodiment), the lens microcomputer 200 instructs the diaphragm driving unit 204 to open the diaphragm 206. The diaphragm driving unit 204 adjusts an opening amount of the diaphragm 206 so that a fully opened state or f-number is F8 in accordance with the instruction from the lens microcomputer 200 (S306).

Figure 6A:
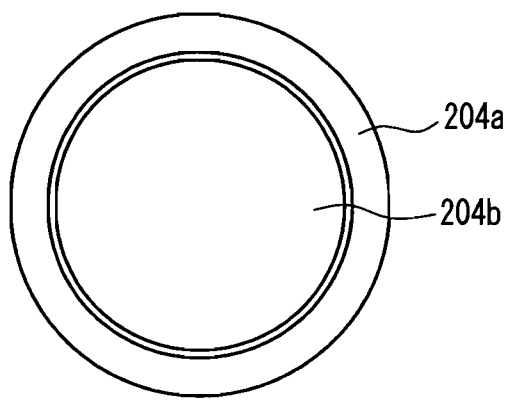
FIG. 6A is a schematic view showing a diaphragm in a fully opened state.
Figure 6B:
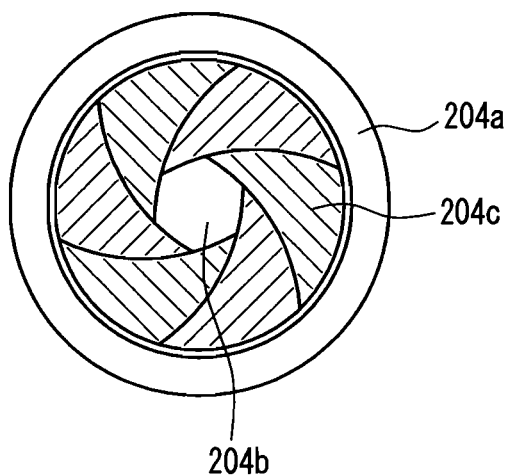
FIG. 6B is a schematic view showing a diaphragm at a time of an f-number of F8.

FIGS. 6A and 6B are views showing the diaphragm 204a in the diaphragm driving unit 204 seen from the direction of the optical axis L. The diaphragm 204a includes an opening 204b for passing an optical image and a plurality of vanes 204c capable of adjusting the opening amount of the opening 204b. FIG. 6A shows a fully opened state of the diaphragm 204a, and FIG. 6B shows a state in which an f-number is F8 while the opening amount of the opening 204b is decreased by the vanes 204c. As an f-number is smaller, the opening amount of the diaphragm 204a is larger.

Returning to FIGS. 3C and 5, next, the sequence microcomputer 100 acquires current positional information on the focusing lens 205 from the lens microcomputer 200, and instructs the lens microcomputer 200 to move the focusing lens 205 in the direction of the optical axis L (arrow B in FIG. 5). The focusing lens driving instruction sent from the sequence microcomputer 100 to the lens microcomputer 200 contains information such as a driving amount, a driving direction, and a driving speed of the focusing lens 205. Next, the lens microcomputer 200 controls the focus control unit 203 to move the focusing lens 205 in the direction of the optical axis L in accordance with the instruction from the sequence microcomputer 100. At this time, the driving speed of the focusing lens 205 is switched in accordance with the brightness of an object as shown in Table 1. More specifically, in the case where an object is bright (BV2 or more in the present embodiment), the focus control unit 203 drives the focusing lens 205 at a speed (second speed) that is ½ of the highest speed. On the other hand, when an object is dark (less than BV2 in the present embodiment), the focus control unit 203 drives the focusing lens 205 at a speed (third speed) that is ⅓ of the highest speed (S307).

Next, when the movement of the focusing lens 205 has been completed, the sequence microcomputer 100 performs AF detection of measuring an AF detected value based on the electrical image output from the image pickup element 106. The AF detected value corresponds to a contrast evaluation value of the electrical image (S308).

Next, the processes shown in S307 and S308 are performed repeatedly. As indicated by AF detection timings P1 to P4 of a graph 501 showing a change in an AF detected value in FIG. 5, as the focusing lens 205 approaches the focused position, the AF detected value obtained in the process shown in S308 increases gradually. When the focusing lens 205 exceeds the focused position, as indicated by the AF detected value at the AF detection timing P5, the AF detected value becomes lower than the AF detected value at a time of the previous detection (AF detected value at the AF detection timing P4 in the example of FIG. 5). The sequence microcomputer 100 monitors the AF detected value (S309), and instructs the lens microcomputer 200 to stop moving the focusing lens 205 at an AF detection timing (P5 in the example of FIG. 5) at which the AF detected value decreased (arrow G in FIG. 5).

The lens microcomputer 200 controls the focus control unit 203 to stop the focusing lens 205. When the focusing lens 205 stops, the lens microcomputer 200 sends a notification that the focusing lens 205 has stopped to the sequence microcomputer 100 (arrow C in FIG. 5) (S310).

Next, the sequence microcomputer 100 instructs the lens microcomputer 200 to move the focusing lens 205 (arrow B in FIG. 5). The focusing lens driving instruction from the sequence microcomputer 100 to the lens microcomputer 200 contains information such as a driving amount, a driving direction, and a driving speed of the focusing lens 205. The lens microcomputer 200 controls the focus control unit 203 in accordance with an instruction from the sequence microcomputer 100, and moves the focusing lens 205 in a direction opposite to the driving direction in the focusing lens driving control shown in S307. At this time, the lens microcomputer 200 knows the driving amount of the focusing lens 205 from the current position of the focusing lens 205 to the focused position, and hence, instructs the focus control unit 203 to perform full energizing. The focus control unit 203 drives the focusing lens 205 at a highest speed (first speed) (S311).

Next, when the movement of the focusing lens 205 has been completed, the sequence microcomputer 100 performs AF detection of measuring an AF detected value based on an electrical image output from the image pickup element 106 at an AF detection timing P6 in FIG. 5. An AF detected value corresponds to a contrast evaluation value of an electrical image (S312).

Next, the sequence microcomputer 100 determines that the focusing lens 205 has arrived at the focused position if the AF detected value obtained in S312 is a highest value. If the focusing lens 205 has not arrived at the focused position, the sequence microcomputer 100 returns to S307 and controls the focusing lens 205 again so that the focusing lens 205 moves in the direction of the optical axis L (S313).

Next, the sequence microcomputer 100 waits until the release button 115 is pressed fully, that is, the switch S2 is turned on. The release button 115 remains pressed halfway from S302 to S313, and hence, when the release button 115 is pressed fully, both the switches S1 and S2 are turned on (S314).

Next, when the release button 115 is pressed fully by the user to turn on the switches S1 and S2, the sequence microcomputer 100 instructs the lens microcomputer 200 to perform diaphragm control based on the light amount information sent from the photometric unit 114 (arrow D in FIG. 5). The lens microcomputer 200 operates the diaphragm driving unit 204 so as to obtain a predetermined f-number (control f-number) based on the instruction from the sequence microcomputer 100. When the f-number in the diaphragm driving unit 204 becomes a control f-number, the lens microcomputer 200 sends a diaphragm control completion notification to the sequence microcomputer 100 (arrow E in FIG. 5) (S315).

Next, the sequence microcomputer 100 instructs the mechanical control unit 103 to perform an exposure operation with respect to the shutter 107. The mechanical control unit 103 moves a front curtain in the shutter 107 so that the front curtain traverses the optical axis L at a predetermined timing, and then, moves a rear curtain so that the rear curtain traverses the optical axis L at a predetermined timing. At this time, an optical image is incident upon the image pickup element 106 at a timing during which the front curtain is retracted from the optical axis and the rear curtain moves onto the optical axis L, and subjected to photoelectric exchange in the image pickup element 106, whereby an electrical image can be obtained (S316).

Next, the sequence microcomputer 100 instructs the mechanical control unit 103 to charge the shutter 107. The mechanical control unit 103 charges the shutter 107 based on the instruction from the sequence microcomputer 100. Further, the sequence microcomputer 100 instructs the lens microcomputer 200 to perform diaphragm control based on the light amount information sent from the photometric unit 114 (arrow D in FIG. 5). The lens microcomputer 200 operates the diaphragm driving unit 204 so as to obtain a predetermined f-number (control f-number) based on the instruction from the sequence microcomputer 100. Specifically, when an object is bright (BV10 or more in the present embodiment), the sequence microcomputer 100 controls the diaphragm driving unit 204 so that the diaphragm driving unit 204 sets an f-number at F8. Further, when an object is dark (less than BV10 in the present embodiment), the sequence microcomputer 100 controls the diaphragm driving unit 204 so that the diaphragm driving unit 204 opens the diaphragm. The diaphragm driving unit 204 is controlled by the lens microcomputer 200 to adjust an opening amount so that a fully opened state or f-number is F8. When an f-number in the diaphragm driving unit 204 becomes a control f-number, the lens microcomputer 200 sends a diaphragm control completion notification to the sequence microcomputer 100 (arrow E in FIG. 5) (S317).

Further, the sequence microcomputer 100 instructs the digital signal processing microcomputer 101 to perform image processing of an electrical image output from the image pickup element 106. The digital signal processing microcomputer 101 subjects an analog image signal output from the image pickup element to digital conversion and performs various kinds of signal processing such as YC processing (S318).

Next, the sequence microcomputer 100 instructs the digital signal processing microcomputer 101 an image display instruction and an instruction to save image data. The digital signal processing microcomputer 101 controls so that the image data subjected to the signal processing in S318 is displayed on the LCD 105 (S319). Along with this, the digital signal processing microcomputer 101 controls so that the image data is compressed and recorded on an information medium such as a memory card in the external memory unit 102 (S320).

Next, the sequence microcomputer 100 instructs each part in the body 1 and the lens microcomputer 200 to perform sleep processing (arrow F in FIG. 5) (S321). Thus, the body 1 and the interchangeable lens 2 are placed in a sleep state (S322).

[3. Effects of the Embodiment, Etc]

According to the present embodiment, the focusing lens 205 can be moved to a focused position at a highest speed by performing the AF control of the phase difference detection system in the finder mode. Therefore, a time for focusing can be shortened.

Further, in the LV mode in which the AF control of the hill climbing system is performed, the skip of a peak of a contrast can be avoided by controlling the driving speed of the focusing lens 205 in accordance with the brightness of an object. More specifically, in the case where an object is dark and a contrast is low, the useless movement of the focusing lens 205 (skip of a peak of a contrast) is eliminated by decreasing the driving speed of the focusing lens 205, whereby the focusing lens 205 can be moved to the focused position quickly and precisely.

Further, in the case where an object is dark, the speed of an electronic shutter becomes lower. Therefore, it is desired further to decrease the driving speed of the focusing lens 205 (⅓ of the highest speed in the present embodiment). With such a configuration, the focusing lens 205 can be moved to the focused position precisely.

Further, the diaphragm 206 that is fully opened in the finder mode of performing the AF of the phase difference detection system is set at an appropriate f-number in accordance with the brightness in the AF control of the hill climbing system, whereby charge overflow in the pixels of the image pickup element 106 can be avoided and a contrast value of an image can be obtained precisely. Thus, the AF control of the hill climbing system can be performed normally.

In the present embodiment, the determination standard of the brightness of an object is set at BV2 in the AF operation during the AF control of the hill climbing system (LV mode), the determination standard may be another value. Further, in the diaphragm operation during the AF control of the hill climbing system, the determination standard of the brightness of an object is set at BV10, the determination standard may be another value.

Further, in the present embodiment, the driving speed of the focusing lens 205 during the AF control of the hill climbing system is set at ½ or ⅓ of the highest speed, the driving speed may be set at another value.

Further, light amount information may not be used irrespective of the presence/absence of the photometric unit 114.

In this case, the driving speed (first speed) of the focusing lens 205 in the finder mode and the driving speed (second speed) of the focusing lens 205 in the LV mode are determined previously, and the driving speed is switched in synchronization with the mode switching of a finder mode/LV mode. In the LV mode, the AF control of the hill climbing system is performed. Therefore, the useless movement (skip of a peak of a contrast) of the focusing lens 205 is eliminated and the focusing lens 205 can be moved to the focused position precisely at a high speed by driving the focusing lens 205 at a second speed lower than the first speed.

Further, in the configuration not using light amount information, an f-number (fully opened state) of the diaphragm 206 in the finder mode and an f-number (f-number in a state other than the fully opened state) of the diaphragm 206 in the LV mode are determined previously, and an f-number is switched in synchronization with the mode switching of finder mode/LV mode. During the LV mode, the AF control of the hill climbing system is performed. Therefore, the diaphragm 206 is switched to an f-number in a state other than the fully opened state, which is darker than the fully opened state, whereby charge overflow in the pixels of the image pickup element 106 can be avoided, and a contrast value of an image can be obtained precisely. Thus, the AF control of the hill climbing system can be performed normally.

Further, the phase difference detection system in the present embodiment is an example of a first detection method in the focal point detecting portion of the present invention. Further, the hill climbing detection system in the present embodiment is an example of a second detection method in the focal point detecting portion of the present invention. Further, the finder mode in the present embodiment is an example of a first operation mode in the present invention. Further, the live view mode in the present embodiment is an example of a second operation mode in the present invention.

Industrial Applicability

The present invention is useful for photographing equipment such as a digital camera, a video camera, and a mobile telephone terminal with a camera.

The invention claimed is:

1. An image pickup device, comprising:
   an image pickup portion that converts an object image into an image signal and outputs the image signal;
   a focusing lens; and
   a control portion that detects a contrast value of an image based on the image signal output from the image pickup portion while moving the focusing lens at a first speed, and controls an operation of the focusing lens based on the detected contrast value,
   wherein, when the control portion detects a peak value of the contrast value and then detects a contrast value lower than the peak value, the control portion moves the focusing lens at a speed higher than the first speed to a position where the control portion detects the peak value.

2. The image pickup device according to claim 1, further comprising a brightness detecting portion that detects brightness of the object,
   wherein the control portion switches the first driving speed in a range lower than a highest speed at which the focusing lens is allowed to move in accordance with the brightness of the object detected by the brightness detecting portion.

3. The image pickup device according to claim 2, wherein when the brightness of the object detected by the brightness detecting portion is a predetermined value or more, the control portion sets, as the first speed, a second speed lower than the highest speed at which the focusing lens is allowed to move, and drives the focusing lens, and
   when the brightness of the object detected by the brightness detecting portion is less than the predetermined value, the control portion sets a third speed lower than the second speed as the first speed and drives the focusing lens.

4. The image pickup device according to claim 2, wherein the control portion decreases an opening amount of the diaphragm to be smaller than that in a fully opened state when the brightness of the object detected by the brightness detecting portion is equal to or more than a predetermined value, and
   the control potion places a diaphragm in the fully opened state when the brightness of the object detected by the brightness detecting portion is less than the predetermined value.

5. The image pickup device according to claim 1, further comprising a diaphragm that regulates a light amount of the object image formed by the image pickup portion and a brightness detecting portion that detects brightness of the object,
   wherein the control portion switches an f-number of the diaphragm in accordance with the brightness of the object detected by the brightness detecting portion.

6. The image pickup device according to claim 1, wherein, when the control portion detects a peak value of the contrast value and then detects a contrast value lower than the peak value, the control portion moves the focusing lens at a highest speed at which the focusing lens is allowed to move to a position where the control portion detects the peak value.

* * * * *